3,220,532
CONTAINER HANDLING APPARATUS
Michael Vamvakas, Hales Corners, Wis., assignor to Geo.
J. Meyer Manufacturing Co., Cudahy, Wis., a corporation of Wisconsin
Filed Nov. 13, 1962, Ser. No. 236,890
12 Claims. (Cl. 198—20)

This invention relates to a container handling apparatus, and in particular to an apparatus for receiving containers, such as bottles or the like, randomly supplied thereto in a vertical position, arranging them in single line fashion, by means of an unscrambler, and thereafter transferring the container by an infeed device into a horizontal position and advancing the same into the moving carriers of a bottle washer.

The container handling apparatus of this invention is intended for use with bottle washing machines having an endless chain with bottle carriers located thereon. The carriers form pockets for the reception of bottles therein as the chain and carriers are advanced past a bottle infeed device which constitutes a bottle supply source for the washer. The infeed device transfers a container to be washed, such as a bottle, from a dead plate or pick-up platform, whereon the bottle is standing in an upright position, to a horizontal position wherein it is deposited into a moving carrier of the washer. The carrier, with the bottle therein, is then advanced to various points in the bottle washer to complete the washing process, and, the washed bottle is then discharged from the washer and the cycle is repeated by subsequent carriers which form an endless conveyor in the washer.

Heretofore, the transferring of bottles from a supply source into a moving carrier has been accomplished by rotating arms or cams which engage the bottle to be transferred at its bottom portion and then sliding the bottle up an incline into a horizontal position thereafter to be pushed by another arm or the like into a moving carrier.

It is apparent that this movement of the bottle relative to the surface which supports it during the transferring thereof is detrimental since this causes scuffing, scratching and chipping of the bottle. Further, the use of several independent means to transfer the bottle into the carrier produces an intermittent movement wherein a smooth continuous transfer is desired.

Heretofore, bottle unscramblers have utilized numerous forms of posts or conveyor belts which agitate the bottles to prevent bottle bridging or jams. Further, mechanical obstructions have been injected between a bottle being transferred and oncoming bottles to relieve the pressure on the transferred bottle. Again, these means of agitation cause undesired scuffing and chipping of the bottle.

To provide a continuous supply of bottles to the infeed device in single line fashion, an unscrambler, having a reversing feed table delivers bottles to a dead plate or pick-up platform of the infeed device. The unscrambler receives bottles in a disorganized or haphazard form from a delivery conveyor and arranges them in single line form on the dead plate where they are subsequently picked up one by one by the infeed device. By reversing the direction of the feed table just prior to the transfer of a bottle, the pressure build up at the dead plate, created by oncoming bottles from the infeed conveyor, is reduced thereby preventing a plurality of bottles from being picked up simultaneously by the infeed device. It is understood that in a conventional bottle washer the endless conveyors having the carriers thereon are arranged in rows of 20, 30 or 40 and a separate infeed is required for each row. The positioning of stalls in the unscrambler, which direct the bottles in single line fashion into the transfer device, the pivotal end gate member and the reversing feed table prevent bottle bridging or jamming as the bottles are being delivered to the infeed device.

To accomplish the objects of this invention, a container handling apparatus comprising an unscrambler having a reversing feed table and flexible gate means which restricts the flow of containers into a plurality of bottle guides or stalls, cooperates with an infeed device having a cable means with container engaging means thereon for transferring containers from a vertical position on a dead plate, to the moving carriers of a bottle washer.

It is an object, therefore, of the present invention to provide a bottle handling apparatus of the character described which overcomes or reduces the above objections by the construction of a gentle handling apparatus which reduces scuffing and chipping of bottles.

It is a further object to provide an unscrambler having no agitating posts or conveying belts to engage jammed or bridged bottles on the feed table of the unscrambler.

It is a further object to provide an infeed device which will handle bottles more gently than heretofore provided, and at the same time increase the output capacity of the handling apparatus.

It is a further object to provide an infeed device which reduces relative movement between the bottle being transferred and the transfer mechanism.

It is a further object to provide an infeed device which is continuous in operation and whereby the transfer of the bottle to a moving carrier is accomplished in a continuous, positive, smooth and efficient manner.

In addition to the above mentioned objects, other objects will be pointed out in, or be apparent from the following specification and claims, which, when taken in conjunction with the accompanying drawings, illustrate a preferred embodiment of the invention.

In the drawings:

FIG. 5 is a fragmentary cross section view of the infeed drive pulley and associated guide structure taken on line 5—5 of FIG. 4 with parts broken away.

Figure 1:
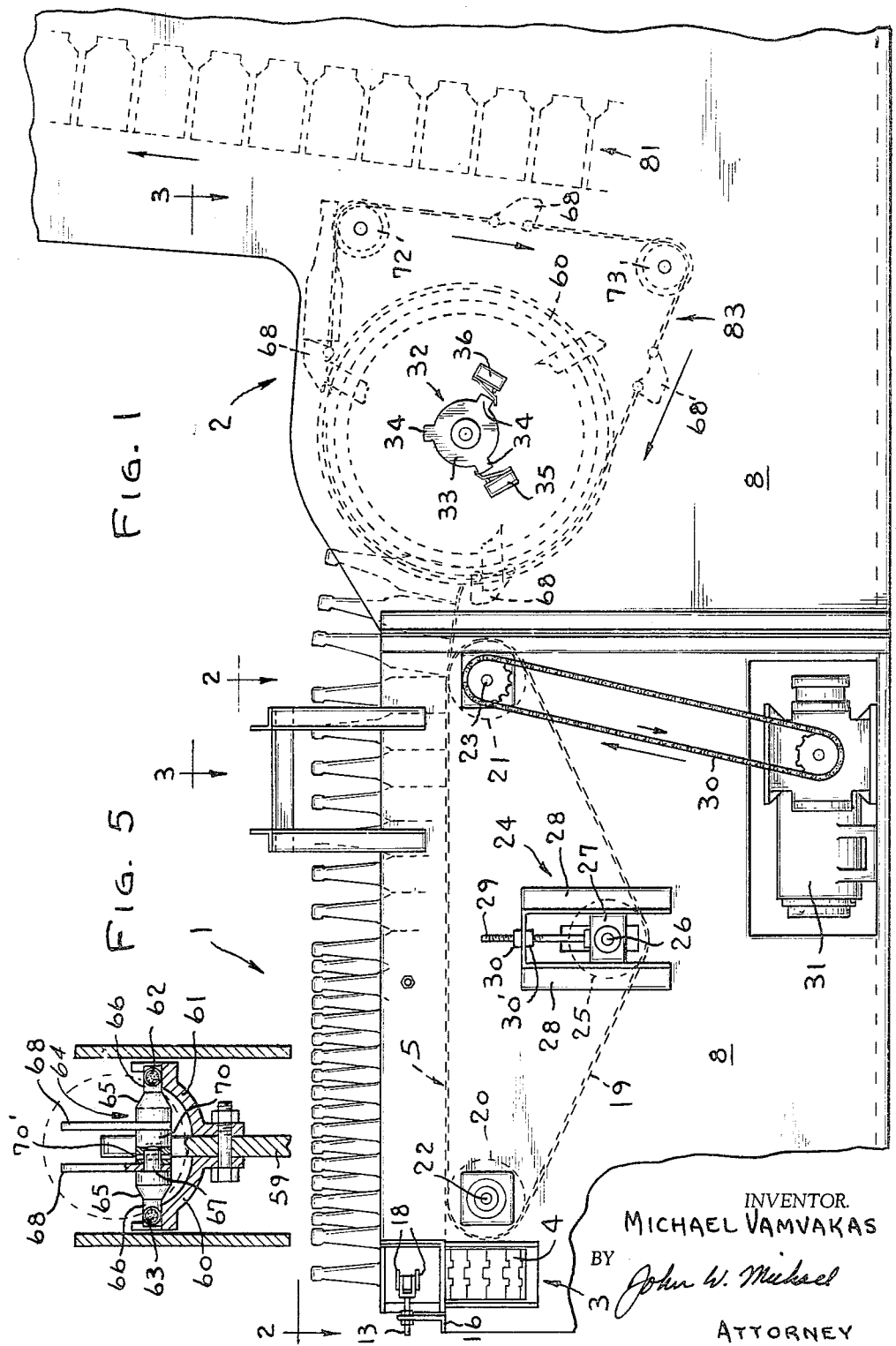
FIG. 1 is a side elevation view of the bottle handling apparatus of this invention showing a part hereof in hidden form.
Figure 2:
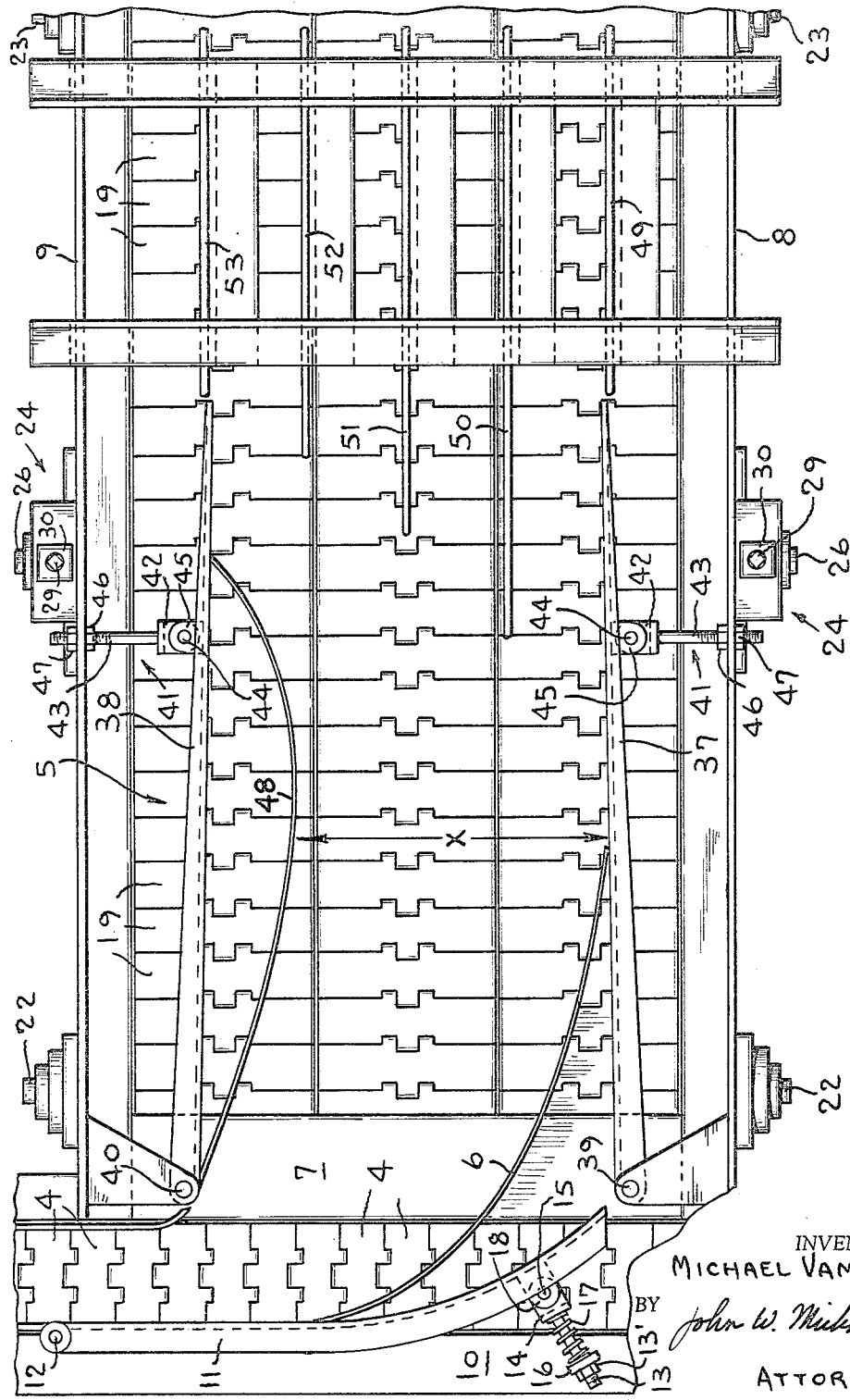
FIG. 2 is a top elevation view of the unscrambler portion of the bottle handling apparatus taken along line 2—2 of FIG. 1.

Referring to the drawings and particularly to FIGS. 1 and 2, the container handling apparatus of this invention comprises a container conveyor means or unscrambler 1 for delivering containers in an upright position to an infeed device 2. An infeed conveyor chain 3 delivers containers, such as bottles, in a single line to the unscrambler 1. This conveyor 3 is of the conventional type wherein a series of endless interconnected conveyor links 4 are entrained over a pair of horizontally positioned sprockets (not shown), one of which is driven by a conventional motor (also not shown). It is understood that the upper reach of the conveyor forms a supporting surface for the containers. As the containers approach the unscrambler they are deflected onto an unscrambler feed table 5 by means of a flexible deflector 6. A stationary plate 7, located between the conveyor 3 and the feed table 5 provides a continuous, smooth, horizontal surface between the said members.

The conveyor 3 and unscrambler 1 are supported by upstanding frame members 8 and 9, as shown in FIG. 2.

A cross support member 10 provides a mounting means for a vertically mounted swinging gate 11, pivotally mounted on shaft 12. The deflector 6 is attached to gate 11 by welding or the like whereby a smooth, continuous, curved surface is formed for the diversion of the bottles onto the feeder table 5 of the unscrambler. The opposite end of the deflector 6 is free.

Adjacent the curved end portion of the gate 11 is a stud element 13 having a yoke portion 14 at one end which is pivotally mounted on a pin 15 which is journaled on the gate 11 by pin supporting bracket 18. A support bracket 16 receives the free end of the stud 13 which is threaded. A spring 17 is interposed on the stud 13 between the yoke 14 and bracket 16 to urge the gate 11 toward the unscrambler 1. A stop nut 13′, engageable with the threaded portion of stud 13, limits the movement of the gate 11 towards the unscrambler. The purpose of the swinging gate and flexible deflector is to be hereinafter described.

The feeder table 5 of the unscrambler 1 consists of an endless conveyor of conventional form having a series of interconnecting conveyor chain links 19. The conveyor links are entrained over horizontally aligned sprockets 20 and 21 which are mounted on shafts 22 and 23, respectively, and located at each end of the feeder table 5. It is understood that on the actual machine there is an additional sprocket located at each end of and on the opposite side of the feeder table 5. That is, as shown in FIG. 1, there would be an additional sprocket directly behind sprocket 20 mounted on shaft 22, and also, an additional sprocket mounted on shaft 23 directly behind sprocket 21 to engage the opposite side of the feeder table 5.

An adjustable take-up 24 for the feeder table 5 provides means for adjusting the tension of the feeder table. An idler wheel 25 is rotatably mounted on a shaft 26 which is journaled in vertically slidable blocks 27. The blocks 27 are mounted in guide channels 28 located on each side of the feeder table. Adjustable means comprising a threaded stud 29 and locking nuts 30 and 30′ position the idler 25 at the desired location. Shaft 23 is driven through sprocket 21 by means of a chain 30 which in turn is driven by a reversing motor 31, as also shown in FIG. 1.

The reversing motor 31 is of the conventional type wherein its forward and reverse motion is controlled by actuating means 32 located on the drive shaft of infeed device 2. The actuating means 32 for motor 31 consists of a timing cam 33 having a plurality of lobes 34 thereon. A pair of switches 35 and 36 actuate alternatively either the forward or reversing operating coils, respectively, of the reversing motor 31 at the desired time. The switching arrangement for the operation of the motor and the associated circuitry therefor are conventional manufacturer's suggested schematics and form no part of the present invention. It is understood, accordingly, that the cam 33 actuates the motor 31 at a predetermined time to reverse the direction of feeder table 5. This reversal of direction, which is to move oncoming containers away from the infeed device will be hereinafter described in detail.

Referring to FIG. 2, the unscrambler 1 has a gate means comprising a pair of side gates 37 and 38 which are pivotally mounted about shafts 39 and 40, respectively. Adjustable means 41, located on each side of the unscrambler, enable side gates 37 and 38 to be adjusted relative to each other. Each adjustable means 41 consists of a yoke member 42 attached to a stud 43 which is pivotally mounted on a pin 44 journaled in a support bracket 45 which is connected to the respective gate member. The position of the gate members relative to each other is determined by lock nuts 46 and 47.

A second flexible deflector plate 48 is attached to gate 38. Both ends of this plate are affixed to the gate 38 by welding or the like. The restriction formed by the two deflector plates 6 and 48 may be varied by adjusting the position of the gates 37 and 38 relative to each other. In the embodiment shown in FIG. 2, four rows of bottles are formed between stalls or bottle separator guides 49–53. These guides provide single rows of bottles to be formed and delivered to the infeed device 2. It has been found that the restriction formed by the gate means between the two deflectors 6 and 48, at "X," as seen in FIG. 2, should be approximately the width of three bottles, that is, one bottle diameter less than the number of rows being formed. As an example, if six rows of bottles were being formed, the restriction would allow only five bottles to pass through the restriction at the same time if the bottles were arranged side by side. The adjustable gate members 37 and 38 allow adjustment for variations in bottle diameter.

Guides 50, 51 and 52 provide a plurality of stalls through which a single row of bottles pass to each infeed device 2. The guides 50, 51 and 52 project toward the infeed conveyor 3 at different lengths so that their leading edges are not in alignment but are staggered. That is, guide 50 projects toward the infeed conveyor approximately the distance of a radius of a bottle further than guide 51. In other words, the distance guide 50 projects beyond guide 51 is approximately the radius of the bottle being handled. It has been found that this variation in length of the projection of the guides as above explained, and the restriction formed by deflectors 6 and 48, reduce the bridging or jamming of bottles as they are conveyed from the conveyor 3 and arranged in single line fashion between guides 49–53. Further, the particular projection of the guides toward the infeed conveyor 3 is advantageous in that the bottles are equally distributed in the stalls. Further, the reversing of the infeed table at the predetermined time prior to the pick-up of a bottle by the infeed device reduces the pressure created by the oncoming bottles delivered to the said infeed device 2. Therefore, when the feed table 5 is reversed in direction, swinging gate 11 will be slightly pivoted away from the feeder table 5 to thereby reduce the pressure of the mass of bottles forming on the said table. And, if necessary, deflector plates 6 and 48 will assist gate 11 at this time to provide additional means to relieve the pressure caused by incoming bottles and the momentary reversal of direction of the bottles caused by reversing the feeder table 5 at the predetermined time.

Figure 4:
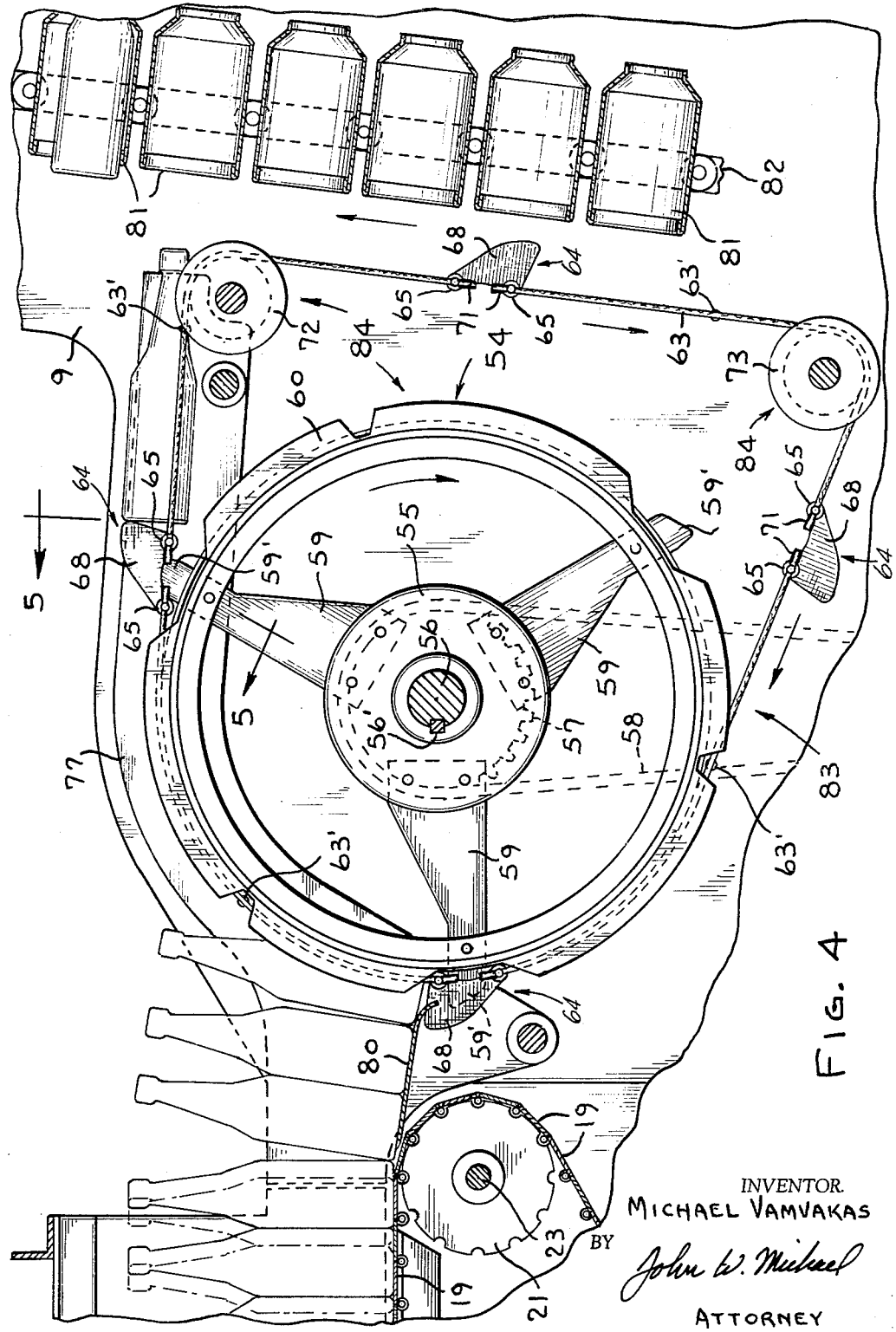
FIG. 4 is a fragmentary sectional view taken along the line 4—4 of FIG. 3.

Referring to FIG. 4, infeed device 2 includes a cable means 83 and a cable support means 84 on which the cable means is movably mounted. The cable support means comprises a pulley 54 having a hub portion 55 which is mounted on shaft 56, a sprocket 57 which is also mounted on shaft 56, and a pair of idler wheels 72 and 73. Key means 56′ provides a driving connection for the hub 55, sprocket 57 and shaft 56. The sprocket 57 is driven by a chain 58 which is driven in a conventional manner by the washer drive means (not shown). Members 59 interconnect the outer periphery of pulley 54 to the hub portion 55. The members 59 extend beyond the outer periphery of pulley 54 to provide driving means 59′ for cable means 83. The outer periphery of pulley 54 is formed by two rim members 60 and 61 which form a concave surface, as shown in FIG. 5. The rim members 60 and 61 are connected to members 59 by a common bolt and nut arrangement, as shown.

Each of the rim members 60 and 61 of the pulley 54 support an endless cable 62 and 63, respectively, of cable means 83. Portions of cables 62 and 63 are interconnected by container engaging means 64 comprising a pair of opposing shaft members 65 each having reduced end portions 66 and 67, as shown in FIG. 5. Outer end portion 66 has a hole therein to accommodate one of the cables, and opposite end portion 67 has a bottle engaging lug 68 rotatively mounted thereon. A spacer 70 is placed on the inner end portion 67 of shaft 65 and a pin 70′ is passed through the spacer and each inner end portion 67 of each shaft 65 to prevent dismantling of the assembly. The cables are passed through the outer end portions 66 of the shafts 65 and a copper crimping tip 71 is placed thereon, as shown in FIG. 4.

Figure 3:
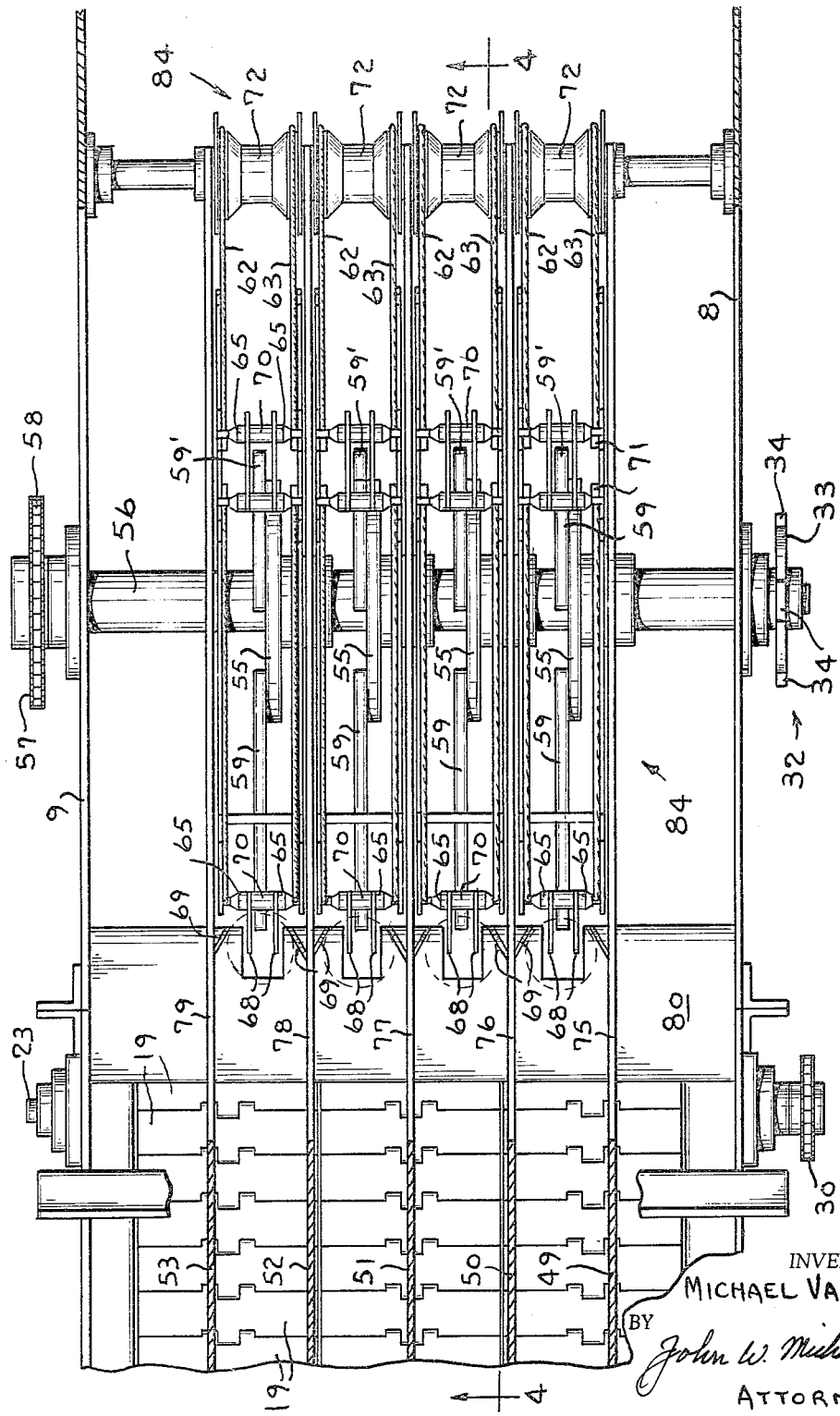
FIG. 3 is a top elevation view of the infeed portion of the bottle handling apparatus taken along lines 3—3 of FIG. 1.

With reference to FIG. 3, for each row of bottles being formed, a pair of stop members 69 are located on the respective guides 75–79 adjacent the infeed device 2. The members 69 prevent the bottles from being forced into contact with the pulley 54 and cables 62 and 63. The members 69 also position the bottle until its bottom is engaged by a container engaging means 64. It is understood that the stop members 69 prevent a bottle from being prematurely moved out of position by frictional engagement of the bottle with the cables.

It can be seen that the container engaging means 64 interconnect portions of cables 62 and 63 and cross member 63', to form cable means 83. Members 63' support the neck of the bottle when the latter is in a horizontal position. Cables 62 and 63 are separated a predetermined distance by the container engaging means 64. The cables are reeved around pulley 54 and idler pulleys 72 and 73. Infeed guide members 75–79 are extensions of the guides 49–53 of the previously described unscrambler 1.

A dead plate 80 mounted between frame members 8 and 9, as shown in FIG. 3, provides a platform for the placement of bottles prior to their transfer by the infeed device 2. This dead plate is at a slight angle relative to the horizontal in the direction of the infeed device so that the bottles thereon will tend to slide toward the said device. It is important that there be at least two bottles on the platform at any given time, one in a pick-up position and the other placed adjacent to it and in contact therewith to maintain the first bottle in position.

As a bottle is placed in position on the dead plate 80, the bottom of the bottle is engaged by a bottle engaging portion 68 of the engaging means 64. The bottle is then transferred in an arcuate path from its vertical position to a horizontal position wherein it is supported by the cables 62 and 63 and the bottle is then advanced along a horizontal path into the upward moving carriers 81 of the bottle washer. The carriers 81 are mounted on a chain 82 which is driven by the drive means of the washer similarly as the infeed device and such drive means, as heretofore mentioned, are not shown. From the foregoing description it is apparent that from the initial contact and subsequent transfer of a bottle by the bottle engaging means 64, there is a minimum of relative movement between the bottle and its transferring means thereby reducing the scuffing and scratching of the bottle.

*Operation*

A supply of containers, such as bottles, are delivered by infeed conveyor 3 to the feed table 5 of the unscrambler 1. The conveyor 3 and feed table 5 are horizontally aligned but at right angles to each other. The bottles are directed onto the feed table 5 from the conveyor 3 by means of a deflector 6. As bottles pass over the stationary plate 7, they are in a disorganized or haphazard fashion, and, the bottles are conveyed toward a series of guides 49–53 which arrange the bottles in single line fashion. To reduce the bridging or jamming of bottles as they are delivered to the feed table 5, a restriction is formed on the feeder table by the gate means, as shown at "X" in FIG. 2. The number of bottles that can pass through this restriction is equal to one less than the total number of bottle rows being formed, as previously pointed out. As the bottles are delivered to the area of the stalls, they form single lines. To assist in the formation of these lines, guides 50–52 project toward the infeed conveyor 3 different amounts, equal to approximately the radius of the bottle being conveyed. The bottles are delivered to a dead plate 80 which is on a slight angle. The bottles are picked up, one by one, from the dead plate 80 by container engaging means 64. Just prior to the pick-up by the engaging means 64, the reversal of the feed table 5 is effected. As shown in FIG. 1, feed table 5 is reversed by actuating means 32. The lobe portions 34 of the timing cam 33 actuate the reversing operating coil of reversing motor 31. It is noted that these lobes actuate the motor in a reverse direction a minor portion of the time during one revolution of the cam 33 so that the direction of the conveyor is primarily towards the infeed device 2. At the time of reversal, bottles which are on the feed table 5 are moved away from the infeed device 2. The only bottles that are not moved in a reverse direction are those positioned on the dead plate 80. These bottles, due to the slight incline which they rest on, will be in a slightly tilted position, as shown in FIG. 4, and the bottle adjacent the infeed will rest against bottle rest 69. It is apparent that oncoming bottles supplied by conveyor 3 will cause a pressure build up at the bottle rest 69 prior to the reversal of the feed table 5. At this time of maximum pressure build up, the swinging gate means 11 will relieve the pressure build up by swinging away from the feeder table 5 to thereby increase the overall area for the bottles to occupy when the feeder table is reversed. It is understood that all of the above factors contribute toward an efficient operation of an unscrambler which reduces bottle bridging or jamming, and, distributes the bottles evenly in single line fashion in the bottle guides or stalls 49–53.

As a bottle is transferred from the dead plate 80 along an arcuate path from a vertical position to a horizontal position, it is partially supported by the cables 62 and 63. And, when the bottle is in a horizontal position it is completely supported by cable means 83. From the horizontal position the bottles are positively moved into the upwardly moving carriers 81. The driving portions 59' engage the container engaging means and cooperate therewith to thereby drive the cable means 83. It is again noted that the movement of the bottle relative to the infeed device which transfers the same into the carrier is reduced to a minimum, thereby reducing the scuffing and chipping of the bottles handled by the apparatus. It is understood that the movement of the carriers is synchronized with the movement of the cable means and cable support means to permit the speed of the apparatus to be varied.

Although but one embodiment of the present invention has been illustrated and described, it will be apparent to those skilled in the art that various changes and modifications may be made therein without departing from the spirit of the invention or from the scope of the appended claims.

I claim:

1. A container unscrambler apparatus for feeding containers to a container infeed apparatus comprising;
    a movable support table for conveying a mass of containers;
    a plurality of guide members forming stalls through which the containers are passed in single rows on said support table; and
    gate means through which the containers carried by said support table are conveyed as they pass to said stalls, said gate means adapted to restrict the flow of containers so that the number of containers which can be simultaneously passed by said gate means will be equal to one less than the number of stalls formed by said guide members.

2. A container unscrambler apparatus according to claim 1 in which the leading edge of each of said guide members is staggered with respect to the leading edge of each adjacent guide member.

3. A container unscrambler apparatus according to claim 1 in which the amount of said stagger is equal to approximately the radius of a container.

4. A container unscrambler apparatus for feeding containers to a container infeed apparatus comprising;
    a movable support table for conveying a mass of containers;

a plurality of guide members forming stalls through which the containers are passed in single rows on said support table;

gate means through which the containers carried by said support table are conveyed as they pass to said stalls, said gate means adapted to restrict the flow of containers so that the number of containers which can be simultaneously passed by said gate means will be equal to one less than the number of stalls formed by said guide members; and reversing means for said support table adapted to periodically reverse the forward movement of said table to thereby back up the containers thereon in a direction away from the infeed apparatus.

5. A container handling apparatus for transferring vertically positioned containers to a horizontal position for deposit thereof into a container carrier;

container infeed means for transferring vertically positioned containers to the container carrier, said container infeed means including a movable cable means and a container engaging means mounted on said cable means, said cable means and container engaging means adapted to engage a container while in a vertical position and to then transfer the container to a horizontal position for deposit in a container carrier; and container conveyor means for moving containers in a vertical position to said container infeed means, said container conveyor means including a movable support member and a gate means through which the containers carried by said support means are conveyed, said gate means adapted to restrict the flow of containers from said conveyor means to said infeed means, said container conveyor means further including a plurality of guide members arranged side-by-side to form stalls, each of said stalls being of a size sufficient to pass a single row of containers therethrough, said gate means adapted to simultaneously pass a given number of containers therethrough, said given number of containers being one less than the number of said stalls.

6. A container handling apparatus according to claim 5 in which the leading edge of each of said guide members is staggered with respect to the leading edge of each adjacent guide member.

7. A container handling apparatus according to claim 6 in which the amount of said stagger is equal to approximately the radius of a container.

8. A container handling apparatus for transferring substantially vertically positioned containers to a substantially horizontal position for deposit thereof into a container carrier;

a movable cable means adapted to engage a container while in a vertical position and to then transfer the container to a horizontal position for deposit in a container carrier; and a cable support means on which said cable means is movably mounted, said cable support means including first and second spaced pulleys over which said cable means is reeved, said first pulley providing support for movement along an arcuate path during which said container moves from a substantially vertical to a substantially horizontal position, said second pulley positioned with respect to said first pulley so that said cable means will move along a substantially horizontal path as it moves from said first to said second pulley to facilitate movement of the container horizontally into the bottle carrier, said cable means including a movable container support means serving as the sole support for a container as the container is transferred in a horizontal position from said first pulley to said second pulley.

9. A container handling apparatus for transferring substantially vertically positioned containers to a substantially horizontal position for deposit thereof into a container carrier;

a plurality of continuously movable cables adapted to engage a plurality of containers while in a vertical position and to then transfer the container to a horizontal position for deposit in a bottle carrier; and a cable support means on which said cables are mounted, said cable support means including a plurality of pulley members over which said cables are reeved, each of said pulley members having a concave rimmed surface in which a container lies and is guided as it is moved from a substantially vertical position to a substantially horizontal position by said cables.

10. A container handling apparatus for transferring substantially vertically positioned containers to a substantially horizontal position for deposit thereof into a container carrier;

a movable cable means adapted to engage a container while in a vertical position and to then transfer the container to a horizontal position for deposit in a container carrier; and a cable support means adapted to support said cable means for movement first along an arcuate path and then along a substantially horizontal path, said cable support means including first and second spaced pulleys over which said cable means is reeved, said cable means including a pair of spaced cables between which a container is supported when the container is being transferred in a horizontal position from said first pulley to said second pulley.

11. A container handling apparatus according to claim 10 in which said cable means includes a plurality of cross members fastened between said pair of spaced cables, said cross member adapted for engagement by one of said spaced pulleys to provide a positive driving connection between said one pulley and said spaced cables.

12. A container handling apparatus according to claim 10 in which one of said spaced pulleys has a concave rim surface in which a container lies as it is moved by said cable means.

References Cited by the Examiner

UNITED STATES PATENTS

| 2,128,192 | 8/1938 | Risser | 198—25 |
| 2,587,959 | 3/1952 | Biner | 198—110 X |
| 2,614,678 | 10/1952 | Ladewig | 198—25 X |
| 2,649,951 | 8/1953 | Sandberg | 198—110 X |
| 2,685,358 | 8/1954 | Heil | 198—30 |

FOREIGN PATENTS

| 622,142 | 10/1935 | Germany. |
| 146,545 | 8/1954 | Sweden. |

SAMUEL F. COLEMAN, *Primary Examiner.*

EDWARD A. SROKA, *Examiner.*